United States Patent [19]

Gully et al.

[11] Patent Number: 5,017,854

[45] Date of Patent: May 21, 1991

[54] VARIABLE DUTY CYCLE PULSE WIDTH MODULATED MOTOR CONTROL SYSTEM

[75] Inventors: Wilfred J. Gully, Torrance; Charles A. Goodman, Garden Grove, both of Calif.

[73] Assignee: Hughes Aircraft Company, Los Angeles, Calif.

[21] Appl. No.: 604,293

[22] Filed: Oct. 29, 1990

[51] Int. Cl.⁵ .............................................. H02P 5/34
[52] U.S. Cl. ..................................... 318/811; 318/599; 388/811; 388/819
[58] Field of Search ............... 318/811, 432, 437, 599; 388/811, 819

[56] References Cited

U.S. PATENT DOCUMENTS

| | | | |
|---|---|---|---|
| 4,409,535 | 10/1983 | Hickman | 318/811 |
| 4,638,225 | 1/1987 | Morinaga et al. | 388/811 |
| 4,656,402 | 4/1987 | Nishikawa | 388/811 |
| 4,972,133 | 11/1990 | Hirota et al. | 318/432 |

Primary Examiner—William M. Shoop, Jr.
Assistant Examiner—John W. Cabeca
Attorney, Agent, or Firm—Terje Gudmestad; W. K. Denson-Low

[57] ABSTRACT

A control system for controlling a direct current powered motor in which the direct current voltage, which may not be constant, is reversibly commutated across the coil or winding of the motor during the predetermined commutation time intervals and chopped at high frequency during each commutation time interval by a variable duty cycle, pulse width modulated voltage, in which the width of each voltage pulse, determined by a reference voltage, is varied as an inverse function of the magnitude of the direct current voltage which exists during each voltage pulse interval.

18 Claims, 4 Drawing Sheets

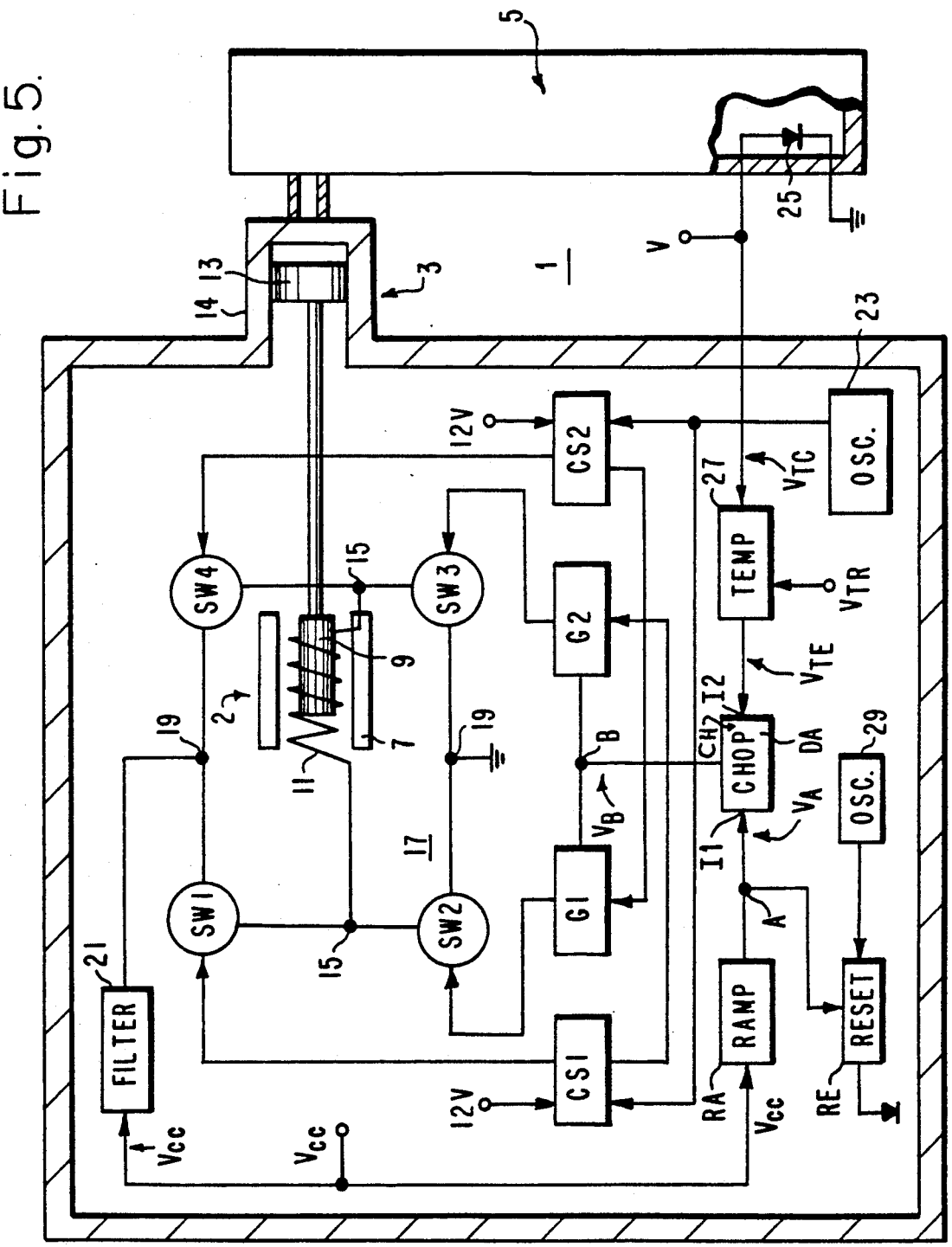

VARIABLE DUTY CYCLE PULSE WIDTH MODULATED MOTOR CONTROL SYSTEM

TECHNICAL FIELD

This invention relates to variable duty cycle, pulse width modulated direct current voltage powered electrodynamic systems.

RELATED APPLICATION FOR PATENT

A co-pending application of Wilfred J. Gully et al, Wilfred J. Gully being one of the applicants in the present application, Ser. No. 07/445,507 Filed Dec. 4, 1989, entitled Motor Driver Circuit for Resonant Linear Cooler, and assigned to the assignee of this invention, is related to this application.

BACKGROUND OF THE INVENTION

In direct current powered electrodynamic control systems, such as control systems for motors, for example, variations in the voltage of the direct current power supply causes variations in the motor output. In applications of motors in controlling a parameter of a physical system, such as temperature, for example, a temperature feedback signal in the motor control loop is used to regulate operation of the motor. In such systems voltage variations in the direct current power supply for the motor interfere with and degrade the closed loop regulation function, and require separate and independent correction.

In applications involving linear motors, such as those in resonant linear compressors, various control techniques are found. U.S. Pat. Nos. 3,819,874; 3,937,600; 4,067,667 and 4,345,442 describe linear compressors having provisions for piston stroke control. Applications of such linear compressors include their use in heat pumps, as described in U.S. Pat. No. 4,345,442. These heat pumps are used in systems for space heating and cooling, as in system applications in the control of the temperature in dwellings. These patents which represent prior art presently known to the applicants, are referenced herein since they are related to linear motor drives in temperature control systems. None, however, are related to or provide disclosures suggesting motor control by means of pulse width modulation, compensated for supply voltage variations, a feature of this invention.

SUMMARY OF THE INVENTION

The related co-pending application, referenced above, describes pulse width modulated, linear motor compressor drives for a Stirling cycle cryogenic cooler, each having a provision in its pulse width modulation control system for compensating for variations in the supply voltage for the linear motor.

In the systems described in that application for patent, two pulse width modulation techniques are described to provide power from a supply of direct current voltage for the coil of the linear motor. One technique comprises a variable amplitude, substantially sinusoidal current of a constant frequency, at or near the resonant frequency of the compressor, produced by pulse width modulation, which determines the length of the stroke of the piston. The second technique comprises a square or rectangular wave signal of constant amplitude, constant frequency, and of variable time duration (duty cycle).

In both of these approaches to temperature regulation of the cryogenic cooler, variations in the direct current supply voltage are compensated for in a motor voltage control loop responsive to feedback of the motor control voltage. The motor control voltage is compared to a reference voltage which, in the temperature regulation application, is a voltage proportional to the temperature error, to control the voltage applied to the coil of the linear motor. Thus control of the piston stroke is provided, in a system compensating for both the supply voltage fluctuations and the temperature variations, in independent but cooperative temperature and voltage control loops.

Although the invention of the referenced co-pending application provides excellent control of the linear motor for the cryogenic cooler compressor, improved performance and simplification is realized with the power control concept of the present invention which provides faster response to supply voltage fluctuations. The improved circuit achieves faster response by using the supply voltage for the motor in a pulse width modulation circuit for controlling the motor, to set the duty cycle of the pulse width modulated voltage which is developed inversely proportionally to the magnitude of the supply voltage for the motor. This power control concept is useful in any power control application employing pulse width modulation. It is particularly useful, however, in a temperature control system, for controlling the power supplied to a linear motor which drives a resonant linear compressor for a cryogenic cooler, in the presence of fluctuations of voltage in the direct current power supply for the motor.

The important function of this control concept is to keep the power transmitted to the linear motor constant at a level determined by a reference voltage, even though there is variation in the direct current supply voltage for the motor. Instead of employing the motor voltage feedback technique of the referenced co-pending application, this improved control corrects the duty cycle (pulse width) for the pulse width modulated power control circuit from the input or supply voltage directly, which reduces response time, and does so accurately over the full range of variation of that supply voltage. The resulting advantages are faster response, better power control and circuit simplification. As in the case of the referenced co-pending application, the reference voltage which indicates the required duty cycle to control the power supplied to the motor, is a voltage proportional to the temperature error. Even though the temperature error voltage, functioning as the reference voltage, may vary, any variation of the supply voltage to the motor always results in an inverse change in the duty cycle of the pulse width modulated voltage in a degree to compensate that voltage variation.

In one implementation of this invention, for producing a variable duty cycle, pulse width modulated voltage, representing the presently known best mode for practicing this invention, a chopping circuit for controlling the duty cycle, comprises a differential amplifier having a pair of input circuits. A direct current reference voltage is coupled to one input circuit and direct current ramp voltage from a ramp voltage circuit, comprising a capacitor in a series RC charging circuit connected between the supply voltage and ground, is coupled to the other input circuit. The input terminal of the capacitor is repetitively grounded by an oscillator driven reset circuit, at a rate which is high or fast compared to the inductive time constant of the circuit, such as a motor control circuit, the power to which is controlled by the pulse width modulated voltage. The differential amplifier of the chopping circuit produces a chopped voltage of constant magnitude which is interrupted or chopped whenever the ramp voltage equals the reference voltage. This sets the pulse duty cycle within the reset intervals. The reset interval is set by the reset circuit which grounds the capacitor. When the input terminal of the capacitor is disconnected from ground, the capacitor charging cycle and the constant magnitude output voltage cycle of the differential amplifier begin again. This generates a train of constant amplitude, rectangular wave voltages, individually having a time duration which is inversely proportional to the magnitude of the input or supply voltage which exists during that capacitor charging cycle and directly proportional to the magnitude of the reference voltage.

BRIEF DESCRIPTION OF THE DRAWINGS

A better understanding of this invention will be had by reference to the following specification when considered in conjunction with the accompanying drawings in which:

FIG. 5 schematically illustrates a resonant linear motor driven cryogenic cooler compressor system embodying the principles of this invention.

DESCRIPTION OF THE PREFERRED EMBODIMENT

Figure 1:
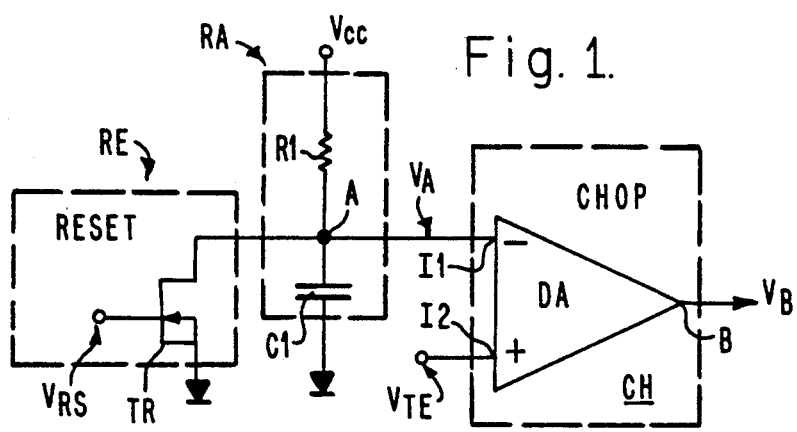
FIG. 1 illustrates a circuit for producing a signal, in the form of a rectangular wave voltage, with a duty cycle that varies as an inverse function of the supply voltage.

Referring to FIGS. 1, 2A and 2B the concept of this control system relies on the fact that electric power for a resonant linear motor 2 (FIG. 5) which drives a compressor 3, as in a cryogenic cooler system, can be defined by $(V_{CC}D)^2/R_L$. $V_{CC}$ is the direct current supply voltage which is chopped at the motor 2 at the frequency of a reset signal $V_{RS}$, FIG. 2A, in successive time intervals T, FIG. 2B, at a rate which is fast compared to the inductive time constant of the linear motor. D is the time interval of the "on" duty cycle or existence of each output voltage pulse within each time interval T of the output voltage $V_B$. This voltage is a rectangular voltage of constant amplitude. $R_L$ is the effective electrical load resistance of the compressor drive.

The circuit of FIG. 1, on an output circuit B, produces an output voltage $V_B$, FIG. 2B, of constant magnitude and having a duty cycle D that varies as $1/V_{CC}$. In FIG. 1, a voltage ramp circuit RA including a resistor R1 and a capacitor C1, in series, in the order named, is connected between the direct current supply voltage $V_{CC}$ and ground. A reset circuit RE has an N-channel channel field-effect transistor TR connected across the capacitor C1, between the terminal A and ground. A differential amplifier DA comprising a chopping circuit CH, has one input I1 connected to a terminal A between the resistor R1 and the capacitor C1. The other input terminal I2 is connected to a reference voltage source $V_{TE}$, which may be fixed or variable, as the application requires. This reference voltage is identified $V_{TE}$ since it is derived as a temperature error voltage herein, in the application of this circuit in a control system for controlling the temperature of a cryogenic cooler. The reference voltage may represent other physical parameters of other physical systems. To allow this simplified analysis, $V_{TE}$ must be significantly less than the smallest value of $V_{CC}$ that will be encountered. The volta $V_B$, FIG. 2B, of constant magnitude appears on the output circuit B of the differential amplifier DA, as long as the terminal A at the capacitor (the voltage $V_A$) is not at ground potential and the voltage $V_A$ is less than the reference voltage $V_{TE}$. When $V_A = V_{TE}$, $V_B$ is cut off.

The resistor R1 is fixed in ohmic value, so the charging rate of the capacitor is controlled as a direct function of the magnitude of the supply voltage $V_{CC}$. The capacitor voltage is plotted in FIG. 2A as a ramp voltage $V_A$. An oscillator generated (oscillator 29, FIGS. 5 and 6), reset voltage pulse $V_{RS}$, shown in FIG. 2A, is coupled to the gate of the field-effect transistor TR. In its brief conducting state, controlled by the reset voltage $V_{RS}$, the field-effect transistor TR discharges the capacitor C1 by connecting its input terminal A to ground. Thereafter the capacitor charging cycle begins again, generating the ramp voltage $V_A$. The time interval T is established by the reset signal, $V_{RS}$. Switching of the reset field-effect transistor TR sets the charging time interval t of the capacitor C1.

The plots of FIGS. 2A and 2B assume a constant reference voltage $V_{TE}$ and a constant direct current supply voltage $V_{CC}$, in the time period or interval of the plotted cycles. When the capacitor volta $V_A$ equals the reference voltage $V_{TE}$, as seen in FIG. 2A, the constant magnitude output voltage $V_B$, at terminal B of the differential amplifier DA, is cut off, as seen in FIG. 2B, producing the rectangular wave voltage $V_B$, which for the conditions depicted, has a duty cycle D of lesser time duration than the time interval T produced by the reset voltage $V_{RS}$. Thus, the "on" time duty cycle D is inversely proportional to the magnitude of the supply voltage $V_{CC}$ and directly proportional to the reference voltage $V_{TE}$. The charge or voltage of the capacitor C1 is directly proportional to the product of the supply voltage $V_{CC}$ and the time duration, t, of its application. The time constant of this circuit is fixed by the ohmic value of the resistor R1. The voltages $V_A$ and $V_{TE}$ and the duration of the voltage $V_B$ may be defined as follows.

$$V_A = \frac{(V_{CC})}{(R)} \frac{t}{C} = V_{TE}, \text{ or;} \quad (1)$$

$$V_{TE} = \frac{V_{CC}(DT)}{RC}, \text{ and} \quad (2)$$

$$(V_{CC}D) = V_{TE}\frac{RC}{T} \quad (3)$$

Any change in the direct current supply voltage $V_{CC}$, always changes the charging rate of the capacitor C1 and inversely changes the duty cycle D. Any change in the reference voltage $V_{TE}$, changes the trip level of the circuit and changes the time interval D of the duty cycle as a direct function of the temperature error voltage $V_{TE}$.

Figure 3:
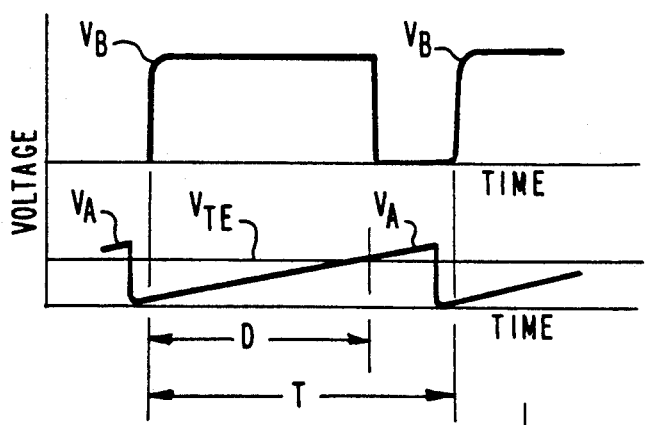
FIGS. 3 and 4 are reproductions of actual voltages developed in a system of the type of FIG. 1 when subjected to two supply voltages $V_{CC}$, of different magnitude, in the presence of a fixed reference voltage $V_{TE}$ showing the reduction in duty cycle of the rectangular wave voltage from FIG. 3 to FIG. 4 as the supply voltage $V_{CC}$ increases.
Figure 4:
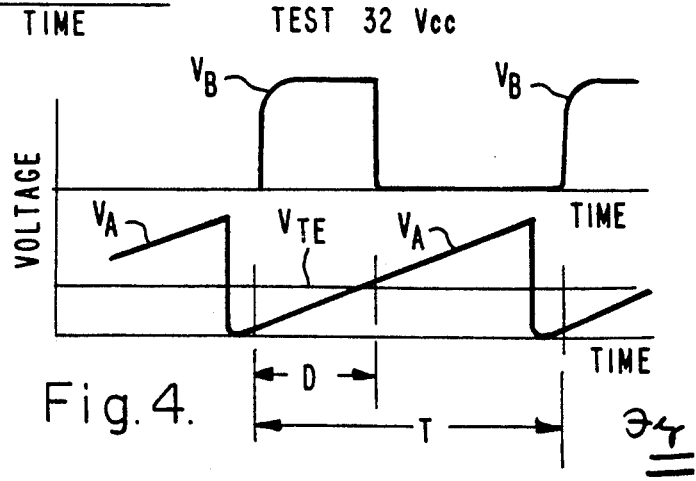

FIGS. 3 and 4 are copies of voltage traces, derived from tests of a circuit of the type of FIG. 1, for two different magnitudes of direct current voltage which represent the anticipated upper and lower limits of supply voltage variations, in an application of this power supply circuit in a linear resonant compressor of a Stirling cycle cryogenic cooler. The direct current power supply voltages $V_{CC}$ and the reference voltage $V_{TE}$, were held constant at 17 volts and 32 volts, respectively, in the tests, producing the results shown in FIGS. 3 and 4, respectively. The ordinates in each of FIGS. 3 and 4 are scaled at 5 volts/scale division. The different charging rates of the capacitor C1, in response to the different magnitudes of the supply voltage $V_{CC}$, are evident. The duty cycle time interval D, in FIG. 3, is significantly greater than that of FIG. 4, because of the lower supply voltage $V_{CC}$ at which the circuit was tested. The circuit of FIG. 1 demonstrated power control in the output volta $V_B$, better than 3% over the range, $17V_{DC}$–$32V_{DC}$.

The cryogenic cooler system 1, illustrated in FIG. 5, is a linear resonant cooler in which temperature is controlled by varying the volume rate of coolant transfer, using a linear motor drive 2 to drive a compressor system 3 coupled to a cryocooler expander. The linear motor 2 comprises a stator 7 and an armature 9 mounted for linear movement relative to the stator 7. The stator 7 mounts a coil 11. Efficiency is obtained by driving the moving parts of the compressor system 3, which comprises a piston 13 in a compressor cylinder 14, and the armature 9 of the linear motor 2, at resonant frequency. Temperature control of the cryogenic cooler system 1 is achieved by varying the stroke of the piston 13 as a function of the temperature error, $V_{TE}$, measured as the variation of the coolant temperature $V_{TC}$, for example, at the cryocooler expander 5, from a reference temperature, $V_{TR}$.

As seen in FIG. 5, the armature 9 of the linear motor 2 is a permanent magnet. Alternatively, the armature 9 may mount the coil 11 and the stator 7 is a permanent magnet. In either of these linear motor configurations, the direction of stroke of the armature 9 depends upon the polarity of the voltage coupled to the coil 11. By reversing the polarity of this voltage, the armature is caused to reciprocate, which bidirectionally strokes the piston 13 in the compressor cylinder 10 for pumping the coolant. In this embodiment, the piston 13 is reciprocated at resonant frequency of the compressor system 3 by reversing the connection of the supply voltage $V_{CC}$ to the coil and by using a pulse width modulated voltage to chop the voltage $V_{CC}$ to control the electric power coupled to the coil. This controls the length of the piston's stroke and, hence, the volume rate at which the coolant is pumped to control the temperature.

This control of the piston 13 is accomplished in a circuit in which the coil 11 of the linear motor 2 is connected across the output terminals 15 of a bridge circuit 17, comprising an active circuit element, such as a field-effect transistor, in each of its four legs. The field-effect transistors, being well known, are not detailed here, but instead are shown as individual blocks SW1–SW4, one in each of the four legs of the bridge circuit. These embody the well known switching and control functions of the individual field-effect transistors in controlling the incremental duration and the direction of flow of the current coupled to the coil 11 of the linear motor 2. The direct current supply voltage $V_{CC}$ is coupled to a pair of input terminals 19 of the bridge circuit 17 via a filter 21. The voltage coupled to the coil 11 of the linear motor 2 is reversed at the frequency of an oscillator 23 which is the resonant frequency of the moving parts of the compressor system 3. The oscillator 23 controls the switching rates of the commutating switches CS1 and CS2, the electrical outputs of which commutate the bridge circuit 17. These commutating switches CS1 and CS2 are enabled on opposite half cycles of the oscillator frequency so that when one commutating switch is on, that is conducting, the other is cut off. The commutating switch CS1 controls switching of the field-effect transistor SW1. The corresponding output of the commutating switch CS2 controls switching of the fieldeffect transistor SW4. These field-effect transistors are in adjacent legs of the bridge circuit 17. A second output of the commutating switch CS1 enables a gate circuit G2, the output circuit of which is coupled to the field-effect transistor SW3. The gate G2 is enabled synchronously with the switching of the field-effect transistor SW1. The corresponding second output of the other commutating switching circuit CS2 enables a gate G1, the output circuit of which is connected to the field-effect transistor SW2. The gate G1 is enabled synchronously with switching of the field-effect transistor SW4. The field-effect transistors SW2 and SW3 are in the remaining adjacent legs of the bridge circuit 17. The pulse width modulated voltage $V_B$ is coupled by the circuit B to the remaining input terminals of the gates G1 and G2 and is coupled to the field-effect transistor SW2 and SW3 during the intervals in which the gates are alternately enabled. The voltage $V_B$ controls the conductivity intervals of transistors SW2 and SW3 and, hence, controls the power on the coil 11 to control the piston stroke.

Figure 2:
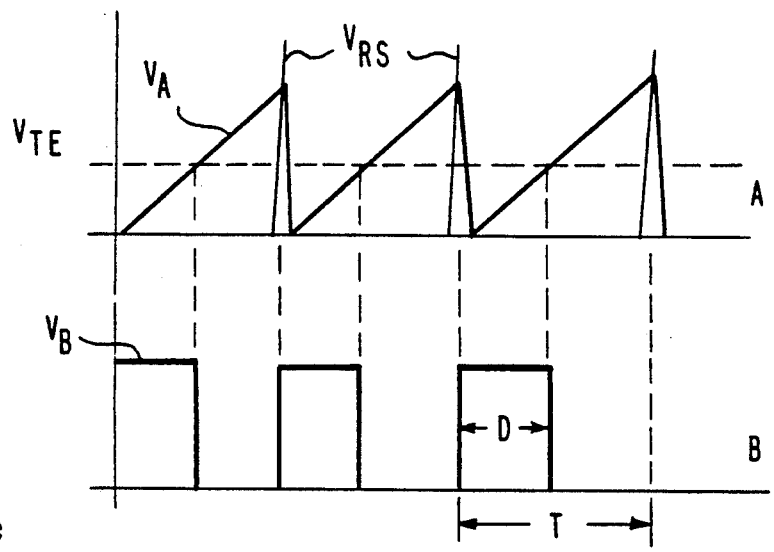
FIGS. 2A and 2B are idealized plots of the relationships of the voltage wave forms at different identified points in the circuit of FIG. 1, showing how that circuit functions to produce the variable duty cycle, rectangular wave voltage.

The power to be applied to the coil 11 of the linear motor 2 is determined by the temperature error voltage $V_{TE}$ which is derived from the difference between a reference voltage $V_{TR}$, which represents the desired temperature of the cryogenic cooler system 1, and the actual temperature of the cryogenic cooler system represented by a voltage $V_{TC}$ which is developed by a temperature sensing diode 26, typically a silicon pn junction device, 1N914, which is located on the detector DEWAR or expander 5. The voltages $V_{TR}$ and $V_{TC}$ are coupled as inputs to a temperature error circuit 27 which, as will be seen in FIG. 6, comprises a differential amplifier, which produces the temperature error voltage $V_{TE}$. The temperature error voltage $V_{TE}$ is coupled to one input 12 of the chopping circuit CH which comprises the differential amplifier DA, described in FIG. 1. The output voltage of this chopping circuit CH as described in connection with FIGS. 1 and 2, is the pulse width modulated voltage $V_B$ appearing on the circuit B and designated $V_B$.

The chopping frequency of the chopping circuit CH, as mentioned in connection with FIG. 1, is controlled by an oscillator 29 which produces the reset signal $V_{RS}$ which switches the reset circuit RE at a high frequency with respect to the inductive time constant of the linear motor 2. A sealed portion of the supply voltage $V_{CC}$ is coupled as input to the ramp circuit RA. The reset circuit cycles the ramp volta $V_A$ at the input of the chopping circuit where it is differentially compared with the voltage $V_{TE}$ and compensates the voltage $V_B$, for variations in the supply voltage $V_{CC}$, as described above in connection with FIGS. 1, 2A and 2B. Thus the duty cycle of the signal $V_B$ which is coupled to the field-effect transistors in the bridge circuit during the enabled periods of the gates G1 and G2 is varied.

Thus by bi-directionally commutating the supply voltage $V_{CC}$ in the bridge circuit at the frequency of the oscillator 23, and using the pulse width modulated voltage $V_B$ to control the coupling of the supply voltage $V_{CC}$ to the coil 11 of the linear motor 2, the coil voltage is reversed at or near the resonant frequency of the compressor and electric power is applied to the coil, as required by the temperature error $V_{TE}$, compensated for voltage variations in the power supply $V_{CC}$.

Figure 6A:
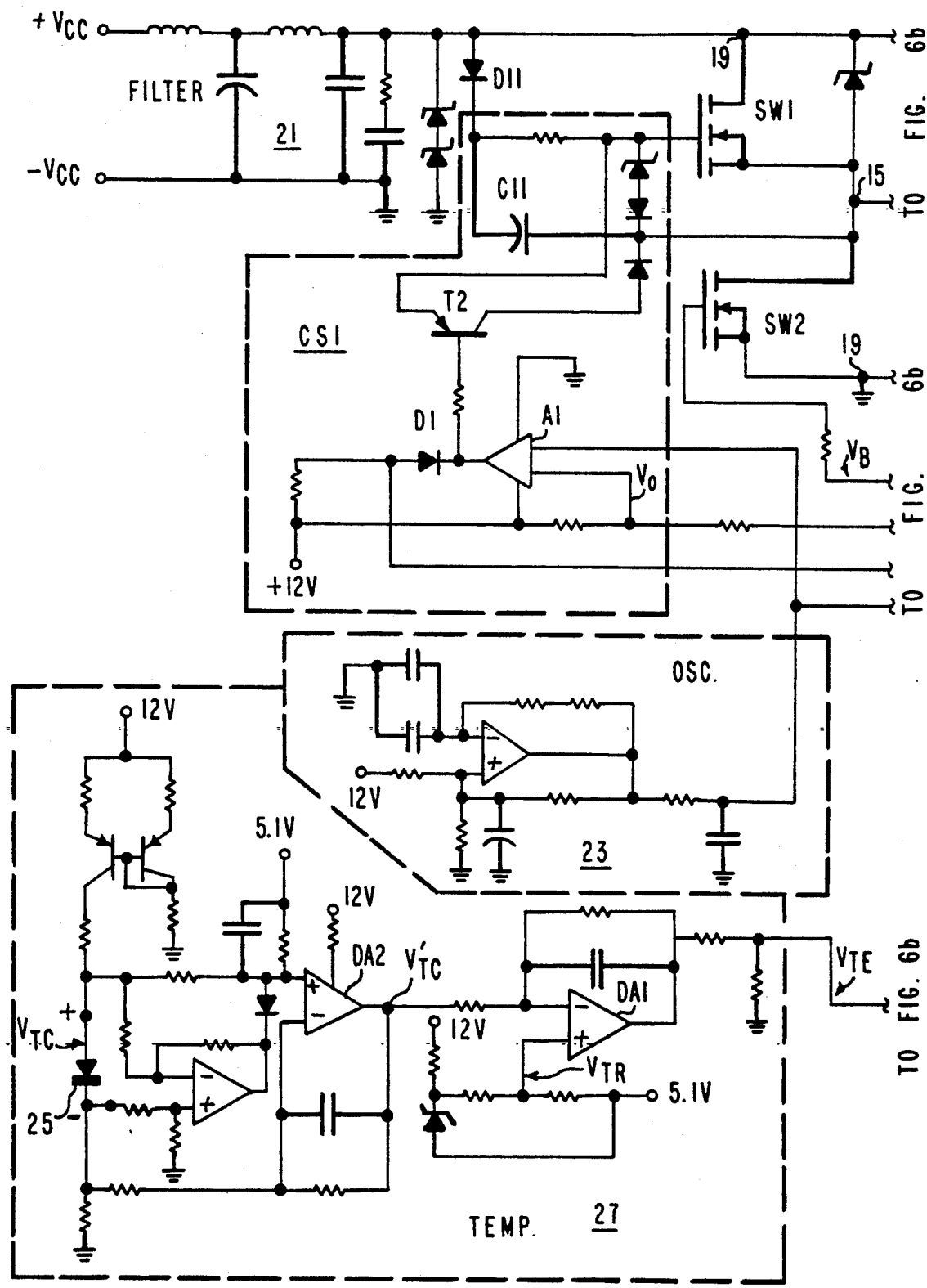
FIG. 6 diagrammatically illustrates the circuit of a system of the type of FIG. 5, substantially in the detail in which it was tested.
Figure 6B:
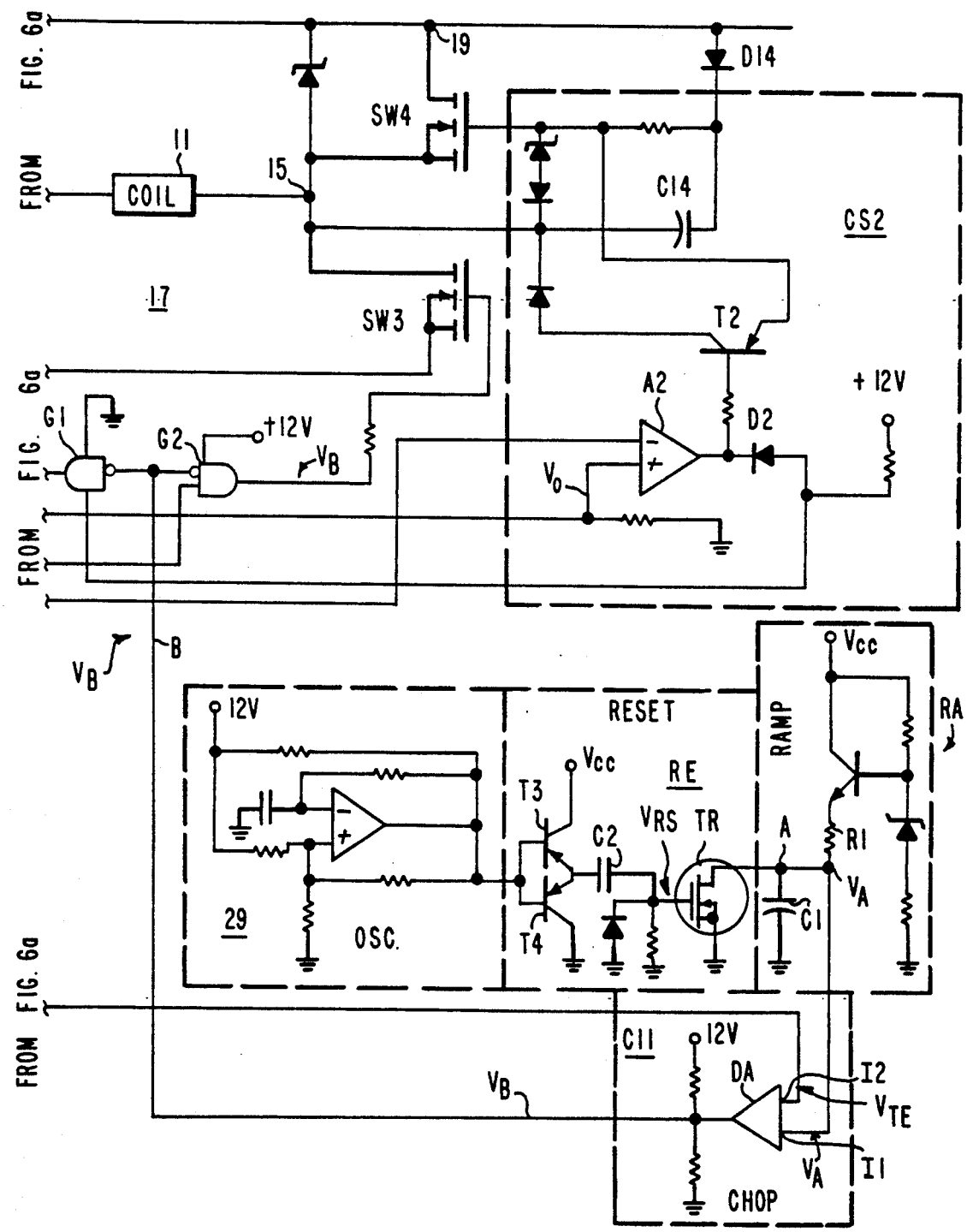

FIG. 6 diagrammatically illustrates this invention in substantially the detail in which it was constructed and tested. In this illustration, those portions of the circuit corresponding to the blocks in the block diagram of FIG. 6 have been enclosed in dash line and bear the same reference characters to facilitate identification. The two oscillators 23 and 29 are triangular wave oscillators, although oscillators having other output wave forms may be utilized. The frequency of the oscillator 29 is much higher than that of the oscillator 23 and does not have to be synchronized therewith since it has a frequency intended to chop the current at the coil of the linear motor 2 at a rate which is high with respect to the motor's inductive time constant. The output of the oscillator 23 independently commutates the bridge circuit 17.

To generate the reset signal $V_{RS}$ in the reset circuit RE the output of the oscillator 29 is connected to the base circuit of each of an NPN transistor T3 and a PNP transistor T4. These transistors are connected in a series circuit between the supply voltage $V_{CC}$ and ground. The transistors T3 and T4 are switched on in opposite half cycles of the oscillator output. When switched on, the transistor T3 provides a charging interval for a capacitor C2 and the transistor T4 when switched on, discharges the capacitor C2. The voltage of the capacitor C2 is the volta $V_{RS}$ which is discussed in FIG. 1, and is coupled to the gate of the field-effect transistor TR. The transistor TR thus periodically grounds the capacitor C1 in the ramp circuit RA, which controls its charging interval. The capacitor C1 is connected in series with a resistor R1 between the supply voltage $V_{CC}$ and ground. The chopping circuit CH receives the temperature error voltage $V_{TE}$ from the temperature error circuit 27 on one of the input terminals I2 of the differential amplifier DA. The output voltage $V_A$ of the ramp circuit RA is coupled to the other input circuit I2 of this differential amplifier. The output of the chopping circuit CH, again, is the variable duty cycle pulse width modulated voltage $V_B$ which is coupled to the coil 11 of the linear motor 2 via the gate circuits G1 and G2.

The temperature error voltage $V_{TE}$ is derived from the temperature circuit 27. The temperature sensing diode 25 is connected to the input terminals of a signal amplifying circuit generally designated 27a which produces a signal $V_{TC}$ which is suitable for application to one input terminal of a differential amplifier DA3. The reference voltage $V_{TR}$ is coupled to the other input terminal The output of the amplifier DA3 is the temperature error voltage $V_{TE}$.

The bridge circuit 17 is shown in greater detail. N-channel field-effect transistors SW1, SW2, SW3 and SW4 are used, respectively, in all four legs of the bridge 17. The coil 11 of the linear motor is connected between the terminals 15 which constitute the output terminals of the bridge circuit 17. A unique "bootstrap" technique is employed to switch the N-channel transistors SW1 and SW4 in the upper legs of this bridge circuit. This is accomplished in the connection of PNP transistors T1 and T2, respectively, across the gate and drain terminals of each of the N-channel field-effect transistors SW1 and SW4. The transistors T1 and T2, as tested, were 2N2907 transistors. The outputs of respective amplifiers A1 and A2 are connected to the base electrodes of the respective transistors T1 and T2. The amplifiers A1 and A2 have positive and negative input terminals marked-+and −. An adjustable offset voltage $V_O$ is coupled as input to the negative terminal of the amplifier A1 and as input to the positive terminal of the amplifier A2, polarizing these amplifiers to operate on alternate half cycles of input from the commutating oscillator 23, to the remaining input terminal of each amplifier.

Switching of these N-channel field-effect transistors SW1 and SW4 requires a switching voltage higher than the power supply voltage $V_{CC}$, which, in this case is a voltage which is about 12 volts above that of the voltage $V_{CC}$. The voltage $V_{CC}$ is coupled as input to the circuit, particularly the bridge circuit 17 at the input terminals 19 via the filter 21 which is a four pole, capacitor terminated, LC filter, as illustrated. Development of the commutating switching voltage required, is achieved by making each of the transistors T1 and T2 do double duty. First, the transistors T1 and T2, when conducting, respectively short the gate electrode of the N-channel field-effect transistor SW1 or SW4 to which it is connected, preventing conduction. While the gate of N-channel field-effect transistor SW1 or SW4 is nonconducting the gate capacitor C11 or C14 is able to acquire a charge through a diode D11 or D14 connected, to positive bridge input terminal 19. When the transistor T1, and alternately the transistor T2, are turned off the gate circuit of the connected N-channel field-effect transistor SW1 or SW4 is released and allows the gate capacitor C11 or C14 to hold that field-effect transistor in a conductive state throughout the commutating cycle therefor.

On the half cycle of the voltage of the oscillator 23 that the output of the amplifier A1 goes high, the output of the amplifier A2 goes low. The transistor T1 is therefore switched off, and the transistor T2 conducts. The N-channel field-effect transistor switch SW1 is gated on by the rising voltage at its gate electrode, produced at the base-emitter junction of the transistor T1, and the N-channel field-effect transistor SW4 is short-circuited and is switched off by the conducting transistor T2. The voltage at the input of an isolating diode D1, connected between the output of the amplifier A2 and 12V, rises, which enables the gate G2. The output voltage of the amplifier A2 being low lowers the voltage at the input of the isolating diode D2, which disables the gate G1. The variable duty cycle, pulse width modulation voltage $V_B$ is now gated by the enabled gate G2, which switches the N-channel field-effect transistor SW3 to conduct at the pulse rate $V_B$ for the duration D of each pulse, throughout this gated interval of the bridge commutation cycle determined by the oscillator 23. The voltage $V_D$ across the output terminals 15 of the bridge is chopped at the frequency of the oscillator 25 and now causes current to flow through the coil 11 of the linear motor 2 in one direction within this interval.

Upon the occurrence of the next half cycle of output of the oscillator 23, the operational states of the amplifiers A1 and A2 are reversed enabling the field-effect transistor SW4 and the gate G1, which reverses the current flow in the coil 11 of the linear motor 2.

The control principles of this invention may be applied to electromagnetic systems other than motors. For example a commutated direct current voltage may be applied to a transformer winding, the other winding of which provides a voltage for controlling a parameter of a physical system. The direct current voltage on that one winding is then controllable by a variable duty cycle, pulse width modulated voltage having a pulse width which is proportional to a reference voltage representing an error in that parameter, and further compensated as to width as an inverse function of variations in the magnitude of the direct current voltage during each pulse interval.

What is claimed is:

1. A control system for controlling an electric motor coupled to a load, said motor having a coil, comprising:
    direct current supply voltage means;
    reference voltage means;
    oscillator means operable at a first frequency;
    a pulse width modulator circuit reset by said oscillator means at a fixed interval of time, and inversely responsive to said direct current supply voltage and directly responsive to said reference voltage for producing a variable duty cycle, pulse width modulated voltage;
    commutating circuit means coupled to said coil for reversibly coupling said direct current supply voltage means to said coil at a second frequency lower than said first frequency; and
    control circuit means commutated by said commutating circuit means for coupling said variable duty cycle, pulse width modulated voltage to said commutation circuit means to control the electrical power coupled from said direct current supply voltage means to said coil.

2. The invention according to claim 1, in which said pulse width modulator circuit comprises:
    a variable voltage circuit connected to said direct current supply voltage means for producing a time varying voltage having a substantially linear rate of increase during each said interval of time, in which the rate of change of said time varying voltage is directly proportional to the magnitude of said direct current supply voltage.

3. The invention according to claim 2, in which said variable voltage circuit of said pulse width modulator comprises:
    a capacitor;
    a capacitor charging circuit connecting said direct current supply voltage means to said capacitor for charging said capacitor; and
    reset circuit means controlled by said oscillator means for discharging said capacitor.

4. The invention according to claim 2, in which said pulse width modulator circuit further comprises:
    a differential circuit for producing an output voltage of substantially constant magnitude and differentially responsive to said time varying voltage and said reference voltage for controlling the time duration of said substantially constant output voltage within each said interval of time.

5. The invention according to claim 3, in which said pulse width modulator circuit further comprises:
    a differential circuit for producing an output voltage of substantially constant amplitude and differentially responsive to the voltage of said capacitor and said reference voltage for controlling the time duration of said substantially constant output voltage within each said interval of time.

6. The invention according to claim 1, in which:
    said load comprises a compressor having a piston connected to said electric motor.

7. The invention according to claim 6, in which:
    said electric motor is a linear motor.

8. The invention according to claim 7, in which:
    said variable duty cycle, pulse width modulated voltage controls the length of the stroke of said linear motor.

9. The invention according to claim 8, in which:
    said second frequency is substantially the resonant frequency of said linear motor and compressor.

10. The invention according to claim 1, in which:
    said first frequency is high with respect to the inductive time constant of said electric motor.

11. The invention according to claim 6, in which:
    said first frequency is high with respect to the inductive time constant of said linear motor.

12. The invention according to claim 1, in which said commutating circuit means, comprises:
    a bridge circuit having input terminals connected to said direct current supply voltage means and output terminals connected to said coil; and
    commutating switching means for controlling said bridge circuit to reversibly couple said supply voltage means to said coil at said output terminals.

13. The invention according to claim 12, in which:
    said bridge circuit comprises four legs;
    controllable unidirectional conducting devices conductively poled in the same direction in diagonal legs of said bridge circuit; and
    said commutating switching means further comprises:
    second oscillator means; and
    respective commutating switching circuits controlled on opposite half cycles of the output of said second oscillator means and having respective output circuits connected to the unidirectional conducting devices in diagonal legs of said bridge circuit.

14. The invention according to claim 13, comprising:
    a gate in one output circuit of each said respective commutating switching circuits to be enabled thereby, each gate having an output circuit coupled to a respective one of a pair of unidirectional conducting devices in adjacent legs of said bridge circuit; and
    circuit means coupling said variable duty cycle, pulse width modulated voltage as input to each gate.

15. The invention according to claim 14, in which:
    said unidirectional conducting devices are fieldeffect transistors having gate electrodes; and
    said output circuit of each gate is connected to a respective gate electrode.

16. A motor control system for controlling the electrical power coupled to the coil of an electromagnetic device from a supply of direct current voltage, comprising:
    commutating circuit means for reversibly coupling said supply of direct current voltage, in equal intervals of time, to said coil;

means for producing a reference voltage indicative of electrical power;

means responsive to said reference voltage and to said direct current voltage for producing a variable duty cycle, pulse width modulated voltage of substantially constant magnitude, having pluralities of pulses in each of said intervals of time and in which the pulse width is directly proportional to said reference voltage and inversely proportional to the voltage magnitude of said direct current voltage; and means for coupling said pulse width modulated voltage to said commutating circuit means for interrupting said direct current voltage coupled to said coil at the frequency of said voltage pulses and for the time interval between the voltage pulses, for controlling the electrical power coupled to said coil.

17. The invention according to claim 16, in which:

the frequency of said voltage pulses is high with respect to the inductive time constant of said motor electromagnetic device.

18. The invention according to claim 17, in which:

said electromagnetic device is an electric motor; and the frequency of said voltage pulses is such with respect to the inductive time constant of said electric motor that the armature of said motor has substantially no physical response to individual voltage pulses of electrical power.

* * * * *